(12) United States Patent
Kogler et al.

(10) Patent No.: US 10,885,263 B2
(45) Date of Patent: Jan. 5, 2021

(54) AUTOMATIC DOCUMENT GENERATION SYSTEMS AND METHODS

(71) Applicant: RiskSpan, Inc., Arlington, VA (US)

(72) Inventors: Bernadette Kogler, Falls Church, VA (US); Suhrud Dagli, New Cannan, CT (US); Thomas Pappalardo, Sterling, VA (US); Amy Ruth James, Cedar Park, TX (US); Senthil Murugan, Stamford, CT (US); Jack Carrubba, Woodbridge, VA (US); Yana Davis, Huger, SC (US); Thilak Subbiah, TamilNadu (IN); Praveen Vairavan, Ridgefield, CT (US); Yu Sun, Stamford, CT (US)

(73) Assignee: RiskSpan, Inc., Arlington, VA (US)

( * ) Notice: Subject to any disclaimer, the term of this patent is extended or adjusted under 35 U.S.C. 154(b) by 0 days.

(21) Appl. No.: 16/028,976

(22) Filed: Jul. 6, 2018

(65) Prior Publication Data

US 2020/0012709 A1 Jan. 9, 2020

(51) Int. Cl.
*G06F 17/00* (2019.01)
*G06F 40/103* (2020.01)
*G06Q 50/18* (2012.01)
*G06F 40/14* (2020.01)
*G06F 40/177* (2020.01)
(Continued)

(52) U.S. Cl.
CPC ............ *G06F 40/103* (2020.01); *G06F 40/14* (2020.01); *G06F 40/177* (2020.01); *G06F 40/186* (2020.01); *G06F 40/197* (2020.01); *G06Q 50/18* (2013.01); *G06F 3/0484* (2013.01)

(58) Field of Classification Search
CPC .............. G05F 17/211; G06F 17/2247; G06F 17/2288; G06F 17/245; G06F 17/248; G06F 3/0484; G06F 40/186; G06F 40/197; G06F 40/177; G06F 40/14; G06F 3/0482; G06F 40/103; G06F 3/04842; G06F 16/9577;
(Continued)

(56) References Cited

U.S. PATENT DOCUMENTS

2002/0091621 A1\* 7/2002 Conklin ................. G06Q 20/10
705/37
2003/0106022 A1\* 6/2003 Goodacre ......... H04M 1/72525
715/226
(Continued)

*Primary Examiner* — Jason T Edwards
(74) *Attorney, Agent, or Firm* — DLA Piper LLP US

(57) ABSTRACT

A processor may determine at least one document formatting feature by analyzing raw data and select templates corresponding to the at least one document formatting feature. The processor may generate a dynamic document template including at least a portion of the raw data and based on the selected templates. The dynamic document template may include a plurality of template sections arranging the raw data into a prescribed document format. The processor may receive at least one user change to the dynamic document template and may regenerate the dynamic document template by regenerating only a subset of the template sections affected by the change while preserving at least one template section unaffected by the change. The processor may generate the formatted document by processing the dynamic document template into a static form having the at least one document formatting feature and including the at least the portion of the raw data.

24 Claims, 22 Drawing Sheets

(51) Int. Cl.
*G06F 40/186* (2020.01)
*G06F 40/197* (2020.01)
*G06F 3/0484* (2013.01)

(58) Field of Classification Search
CPC .... G06F 40/109; G06F 40/106; G06F 40/111;
G06F 40/166; G06Q 50/18
USPC .......................................................... 715/229
See application file for complete search history.

(56) References Cited

U.S. PATENT DOCUMENTS

| | | | |
|---|---|---|---|
| 2005/0091135 A1* | 4/2005 | Britton .................... | G06Q 40/00 705/35 |
| 2006/0288270 A1* | 12/2006 | Gaurav ................. | G06F 17/243 715/210 |
| 2010/0313119 A1* | 12/2010 | Baldwin ............... | G06F 17/248 715/256 |
| 2016/0253306 A1* | 9/2016 | Fan ........................ | G06F 40/109 715/227 |
| 2017/0010773 A1* | 1/2017 | Curcelli ................ | G06F 3/0483 |
| 2017/0220546 A1* | 8/2017 | Codrington ........... | G06F 3/0484 |
| 2018/0046609 A1* | 2/2018 | Agarwal ............... | G06F 17/248 |
| 2018/0267950 A1* | 9/2018 | de Mello Brandao ..................... | G06F 17/248 |

* cited by examiner

400

```
File  Edit  Format  View  Help
1 AA
2 AB
3 XY
4 ZZ
```

| Assumed Characteristics of the Loans Underlying Group X | | | | | |
|---|---|---|---|---|---|
| Issue Date Unpaid Principal Balance | Net Rate* (%) | Gross Rate(%) | Original Term (in Months) | Remaining Term to Maturity (in Months) ("WARM") | Loan Age (in Months) ("WALA") |
| $  28,800.00 | 3.040 | 4.132 | 360 | 9 | 351 |
| 30.00 | 2.700 | 3.875 | 360 | 5 | 355 |
| 75.00 | 2.900 | 3.625 | 360 | 4 | 356 |
| 67.00 | 3.000 | 3.625 | 360 | 4 | 356 |

```
##################
GROUP X ####
##################
ABC-XY AMORT 2 MGROUP = 1

PAY PRINCIPAL ###
SMPAY ZEROBAL AMORT 2 ABC-XY PRORAT ABC-XX 015-PC PRORAT ABC-YY
```

```
============ TRANCHE INFORMATION ============

PAC Range                              Avg.
     Class    Description     Lower  Upper      Amount        Coupon   Life  Group
     ------   ------------    -----  -----   --------------   -------  ----  -----
  1  ABC-aa   PT_FIX           0%     0%     $13,000,000.00   3.50000%  5.7    1
  2  ABC-bb   PT_FLT           0%     0%     $79,000,061.00   1.73903%  5.5    2
  3  ABC-cc   NTL_INV_IO       0%     0%     $89,418,061.00   4.77807%  5.5    3
  4  ABC-dd   PAC_AD_FIX       0%     0%     $50,500,000.00   2.78000%  4.2    4
```

FIG. 4D

```
======== RECOMBINATION TRANCHES ========

Recombination 1
ABC-aa    =  ABC-cc   * 100.00% - Percentage Used: 100.00%
          +  ABC-dd   *  12.50% - Percentage Used: 100.00%

Recombination 2
ABC-bb    =  ABC-ee   * 100.00% - Percentage Used:   0.00%
          +  ABC-ff   *  25.00% - Percentage Used:  87.50%
```

408

```
FLOATER INDICES INITIAL RATE:

FLOATER FORMULA:
         Initial    Maximum    Minimum    Delay /    # of Months     Formula for
         Interest   Interest   Interest   No Delay   Initial Rate    Calculation of
Class    Rate       Rate       Rate       Class      is Fixed        Interest Rate
-------  --------   --------   --------   --------   ------------    --------------

ABC-aa   1.8%       6.58%      0.50000%   No Delay        1          LIBOR1BBA
                                                                       *  1.00000000
                                                                       +  0.50000000

ABC-bb   4.75%      6.30%      0.00000%   No Delay        1          LIBOR1BBA
                                                                       * -1.00000000
                                                                       +  5.30000000
```

| Distribution Date | 0% | 100% | 125% | 200% | 250% | 300% | 500% | 700% | 900% |
|---|---|---|---|---|---|---|---|---|---|
| Initial | 100 | 100 | 100 | 100 | 100 | 100 | 100 | 100 | 100 |
| August 2018 | 98 | 92 | 91 | 91 | 91 | 91 | 91 | 87 | 77 |
| August 2019 | 95 | 82 | 79 | 79 | 79 | 79 | 65 | 47 | 31 |
| August 2020 | 93 | 72 | 67 | 67 | 67 | 66 | 41 | 22 | 8 |
| August 2021 | 90 | 62 | 57 | 57 | 57 | 51 | 25 | 8 | 0 |
| August 2022 | 88 | 53 | 47 | 47 | 47 | 39 | 14 | * | 0 |
| August 2023 | 85 | 45 | 38 | 38 | 38 | 29 | 6 | 0 | 0 |
| August 2024 | 82 | 37 | 29 | 29 | 29 | 21 | 1 | 0 | 0 |
| August 2025 | 78 | 29 | 23 | 23 | 23 | 15 | 0 | 0 | 0 |

PSA Prepayment Assumption

```
                                              |  DEAL NAME - ABC-XY
                                              |  DEALER - ABC Inc.
                                              |  PRICING ASSUMPTIONS
                                              |

Class                                                    Price

AA    ..................................................  15.6250000000%
    BB    ..................................................  17.4062500000%
    CC    ..................................................  28.6875000000%
```

416

| Sensitivity of the AA Class to Prepayments | | | | | | | | | |
|---|---|---|---|---|---|---|---|---|---|
| CPR Prepayment Assumption | | | | | | | | | |
| | 50% | 100% | 200% | 300% | 425% | 800% | 900% | 1200% | 1700% | 2600% |
| Yield to Maturity | 14.5% | 9.0% | 3.2% | 0.2% | 0.2% | -10.6% | -22.3% | -53.7% | -98.4% | -150.9% |

| Lower Band: | 200% | | DEAL NAME: ABC-XY | | | | |
|---|---|---|---|---|---|---|---|
| Upper Band: | 405% | | DEALER NAME: ABC Inc. | | | | |
| Group: | N | | PRINCIPAL BALANCE SCHEDULES | | | | |

| Distribution Date | Scheduled Balance | Distribution Date | Scheduled Balance | Distribution Date | Scheduled Balance |
|---|---|---|---|---|---|
| March 2030 | $1,800,839.78 | March 2034 | $454,959.55 | March 2038 | $184,224.09 |
| April 2030 | $1,614,125.90 | April 2034 | $413,814.34 | April 2038 | $96,096.92 |
| May 2030 | $1,570,012.76 | May 2034 | $401,915.20 | May 2038 | $93,059.86 |
| June 2030 | $1,507,875.61 | June 2034 | $390,342.16 | June 2038 | $90,110.45 |

REVIEW UPLOADED CONTENT

Working on Version: 2

Prospectus Supplement $750,000,000

Guaranteed Pass-Through Certificates

| Class | Group | Principal Type(1) | Interest Rate | Interest Type(1) | CUSIP Number | Final Distribution Date |
|---|---|---|---|---|---|---|
| AA | 1 | PAC/AR | 2.5% | FIX | | June 2046 |
| BB | 1 | NTL | 4.00 | FIX/IO | | June 2046 |
| CF | | PAC/AD | 3.00 | FIX | | January 2054 |

Prepayments to Certificateholders
We will make monthly payments on the certificates. You, the investor, will receive interest accrued on the balance of your certificate (except in the case of the accrual classes), and principal to the extent available for payment on your class.

FINALIZE CHANGES — 628

AUTOMATIC DOCUMENT GENERATION SYSTEMS AND METHODS

BACKGROUND

A collateralized security is secured by cashflows of an underlying asset or collection of assets. For example, a mortgage-backed security is a type of asset-backed security that is secured by a mortgage or collection of mortgages. The assets are sold to a group of individuals or trusts that securitizes, or packages, the assets together into a security that investors can buy. The security is described by a legal disclosure document or series of legal disclosure documents including a prospectus, offering memorandum, and/or other related legal disclosure documents. Formal legal disclosure documents are required by and filed with the Securities and Exchange Commission or required by Investors and provide details about an investment offering for sale to investors.

Collateralized securities also require legal disclosures (a prospectus supplement (legal disclosure) is an example of such a disclosure). Legal disclosures provide supplemental information describing the assets collateralizing the security and the accompanying cashflows. Traditionally, many legal disclosures are prepared by printers, or attorneys, who manually analyze documents and prepare the documents.

SUMMARY OF THE DISCLOSURE

A method of automatically generating a formatted document may include receiving, by at least one processor, raw data. The method may include determining, by the at least one processor, at least one document formatting feature by analyzing the raw data. The method may include selecting, by the at least one processor, at least one static template and at least one dynamic template corresponding to the at least one document formatting feature from at least one memory. The method may include generating, by the at least one processor, a dynamic document template including at least a portion of the raw data and based on the selected at least one static template and the selected at least one dynamic template. The dynamic document template may include a plurality of template sections arranging the raw data into a prescribed document format. The method may include receiving, by the at least one processor, at least one user change to the dynamic document template. The at least one user change may affect a subset of the template sections including less than all of the template sections. The method may include regenerating, by the at least one processor, the dynamic document template by regenerating only the subset of the template sections while preserving at least one template section unaffected by the at least one user change. The method may include generating, by the at least one processor, the formatted document by processing the dynamic document template into a static form having the at least one document formatting feature and including the at least the portion of the raw data.

In some embodiments, the selecting may be further based on at least one user input and/or at least one dealer information.

In some embodiments, the plurality of template sections may be HTML documents.

In some embodiments, the formatted document may be, for example, a prospectus supplement or other legal disclosure document. In some embodiments, the at least one document formatting feature may define at least one legal disclosure document feature, and the generating of the dynamic document template may include arranging the at least the portion of the raw data into a specified legal disclosure document format including the at least one legal disclosure document prospectus supplement feature.

In some embodiments, the method may include modifying, by the at least one processor, the selected at least one static template, the selected at least one dynamic template, or a combination thereof based on the at least one user change. The method may include storing, by the at least one processor, the modified at least one static template, the modified at least one dynamic template, or the combination thereof in the at least one memory.

In some embodiments, the method may include providing, by the at least one processor, a user interface. The raw data and the at least one user change may be received through the user interface. In some embodiments, the method may include displaying, by the at least one processor, the dynamic document template in the user interface. In some embodiments, the method may include displaying, by the at least one processor, the formatted document in the user interface. In some embodiments, the method may include generating, by the at least one processor, a tracked changes version of the dynamic document template showing at least one change between the generated dynamic document template and the regenerated dynamic document template, and displaying, by the at least one processor, the tracked changes version in the user interface.

A system for automatically generating a formatted document may include at least one processor and at least one memory in communication with the at least one processor. The at least one memory may be configured to store a plurality of static templates, a plurality of dynamic templates, and a plurality of instructions that, when executed by the at least one processor, cause the at least one processor to perform processing. The processing may include receiving raw data. The processing may include determining at least one document formatting feature by analyzing the raw data. The processing may include selecting at least one static template and at least one dynamic template corresponding to the at least one document formatting feature from the at least one memory. The processing may include generating a dynamic document template including at least a portion of the raw data and based on the selected at least one static template and the selected at least one dynamic template. The dynamic document template may include a plurality of template sections arranging the raw data into a prescribed document format. The processing may include receiving at least one user change to the dynamic document template. The at least one user change may affect a subset of the template sections including less than all of the template sections. The processing may include regenerating the dynamic document template by regenerating only the subset of the template sections while preserving at least one template section unaffected by the at least one user change. The processing may include generating the formatted document by processing the dynamic document template into a static form having the at least one document formatting feature and including the at least the portion of the raw data.

In some embodiments, the selecting may be further based on at least one user input and/or at least one dealer information.

In some embodiments, the plurality of template sections may be HTML documents.

In some embodiments, the formatted document may be, for example, a prospectus supplement or other legal disclosure document. In some embodiments, the at least one document formatting feature may define at least one legal disclosure document feature, and the generating of the dynamic document template may include arranging the at least the portion of the raw data into a specified legal disclosure document format including the at least one legal disclosure document feature.

In some embodiments, the instructions may further cause the processor to perform processing including modifying the selected at least one static template, the selected at least one dynamic template, or a combination thereof based on the at least one user change; and storing the modified at least one static template, the modified at least one dynamic template, or the combination thereof in the at least one memory.

In some embodiments, the instructions may further cause the processor to perform processing including causing a user device to display a user interface, wherein the raw data and the at least one user change are received through the user interface. In some embodiments, the instructions may further cause the processor to perform processing including causing the user device to display the dynamic document template in the user interface. In some embodiments, the instructions may further cause the processor to perform processing including causing the user device to display the formatted document in the user interface. In some embodiments, the instructions may further cause the processor to perform processing including generating a tracked changes version of the dynamic document template showing at least one change between the generated dynamic document template and the regenerated dynamic document template, and causing the user device to display the tracked changes version in the user interface.

BRIEF DESCRIPTION OF THE FIGURES

FIGS. 4A-4G show source document examples according to an embodiment of the present disclosure.

FIGS. 6A-6L show user interface examples according to an embodiment of the present disclosure.

DETAILED DESCRIPTION OF SEVERAL EMBODIMENTS

Figure 1:
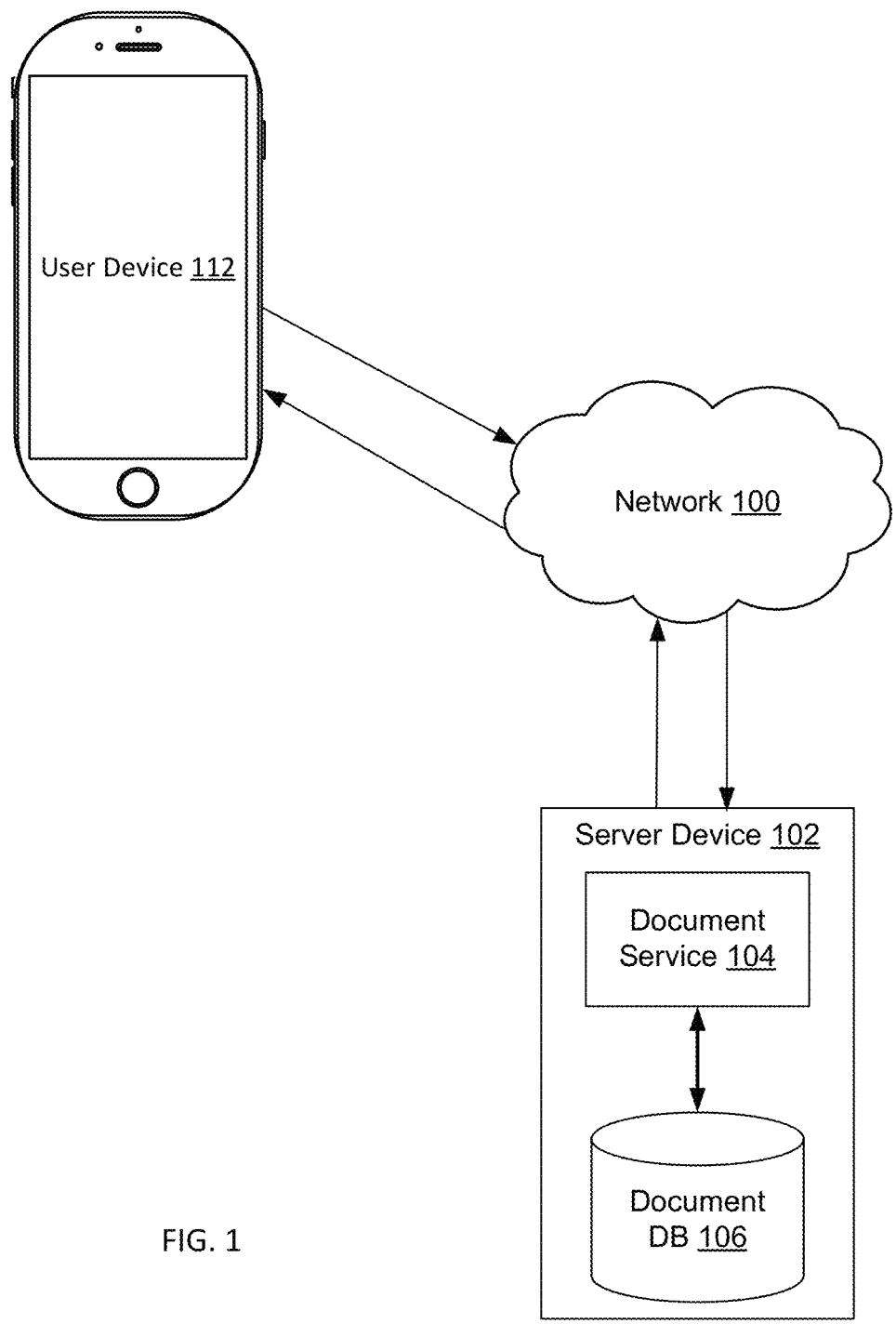
FIG. 1 shows a network according to an embodiment of the present disclosure.

FIG. 1 shows a network according to an embodiment of the present disclosure. The network may provide a platform by which a user of user device 112 may supply information to server device 102 that server device 102 may automatically turn into a completed and legally valid legal disclosure document. For illustration purposes only, the following examples use a specific legal document called a prospectus supplement (ProSup). However, the platform may generate any types of legal documents (e.g., by changing input data and/or template data used as described herein). User device 112 may send data to server device 102 by network 100 (e.g., the Internet or another public and/or private network). Server device 102 may be a server configured to analyze the data and automatically generate a ProSup therefrom. Server device 102 may include document service 104, which may be configured to process received data into completed ProSups, and document database 106, which may be configured to store received data, completed ProSups, and/or data enabling creation of ProSups. Server device 102 is depicted as a single server including a single document service 104 and document database 106 for ease of illustration, but those of ordinary skill in the art will appreciate that server device 102 may be embodied in different forms for different implementations. For example, server device 102 may include a plurality of servers.

User device 112 may send data to server device 102, and server device 102 may use the data to create a ProSup. In some embodiments, user device 112 may present a user interface (UI) for submitting the data and reviewing or editing the completed ProSup. Examples of the data submitted through the UI, and of UI features, are provided below. User device 112 is depicted as a single portable device for ease of illustration, but those of ordinary skill in the art will appreciate that user device 112 may be embodied in different forms for different implementations. For example, a plurality of user devices 112 may be connected to network 100, and/or user device(s) 112 may be any type of computing device, such as a laptop, personal computer, tablet, etc.

Figure 2:
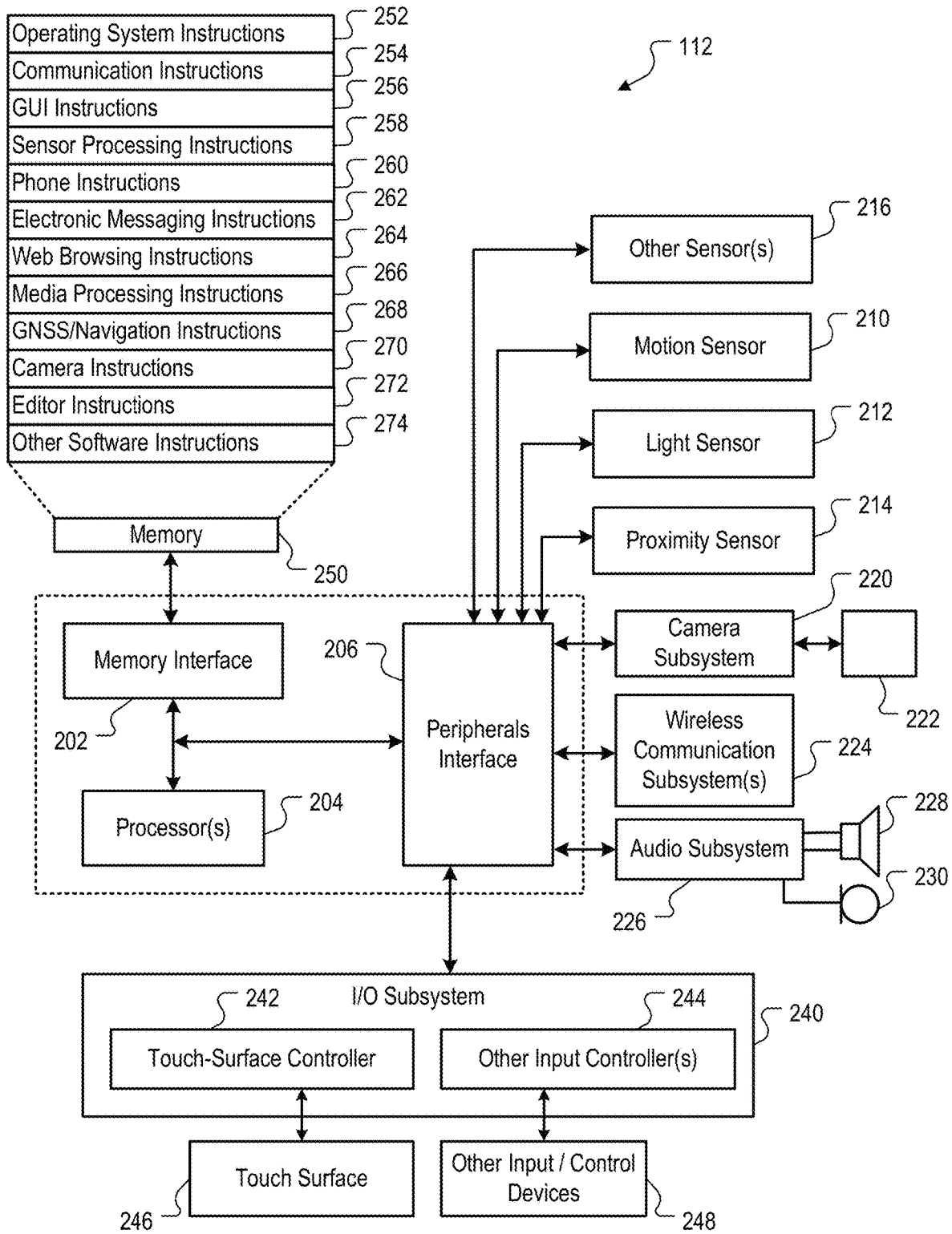
FIG. 2 shows a user device according to an embodiment of the present disclosure

FIG. 2 shows a block diagram of an example computing device, for example a computing device configured to function as user device 112. For example, user device 112 may receive information used to generate and/or edit legal disclosure documents as described herein. The user device 112 may include a memory interface 202, one or more data processors, image processors, and/or central processing units 204, and a peripherals interface 206. The memory interface 202, the one or more processors 204, and/or the peripherals interface 206 may be separate components or may be integrated in one or more integrated circuits. The various components in the user device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 224. The specific design and implementation of the communication subsystems 224 may depend on the communication network(s) over which the user device 112 is intended to operate. For example, the user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the user device 112 may present recorded audio and/or video files, such as MP3, AAC, and MPEG files. In some implementations, the user device 112 may include the functionality of an MP3 player, such as an iPod™. The user device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store editor instructions 272 to facilitate gathering data for creating and/or editing ProSup and/or other legal disclosure documents and/or communicating with server device 102 to process the data. The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the user device 112 may be implemented in hardware and/or in software, including in one or more signal processing and/or application specific integrated circuits.

Figure 3:
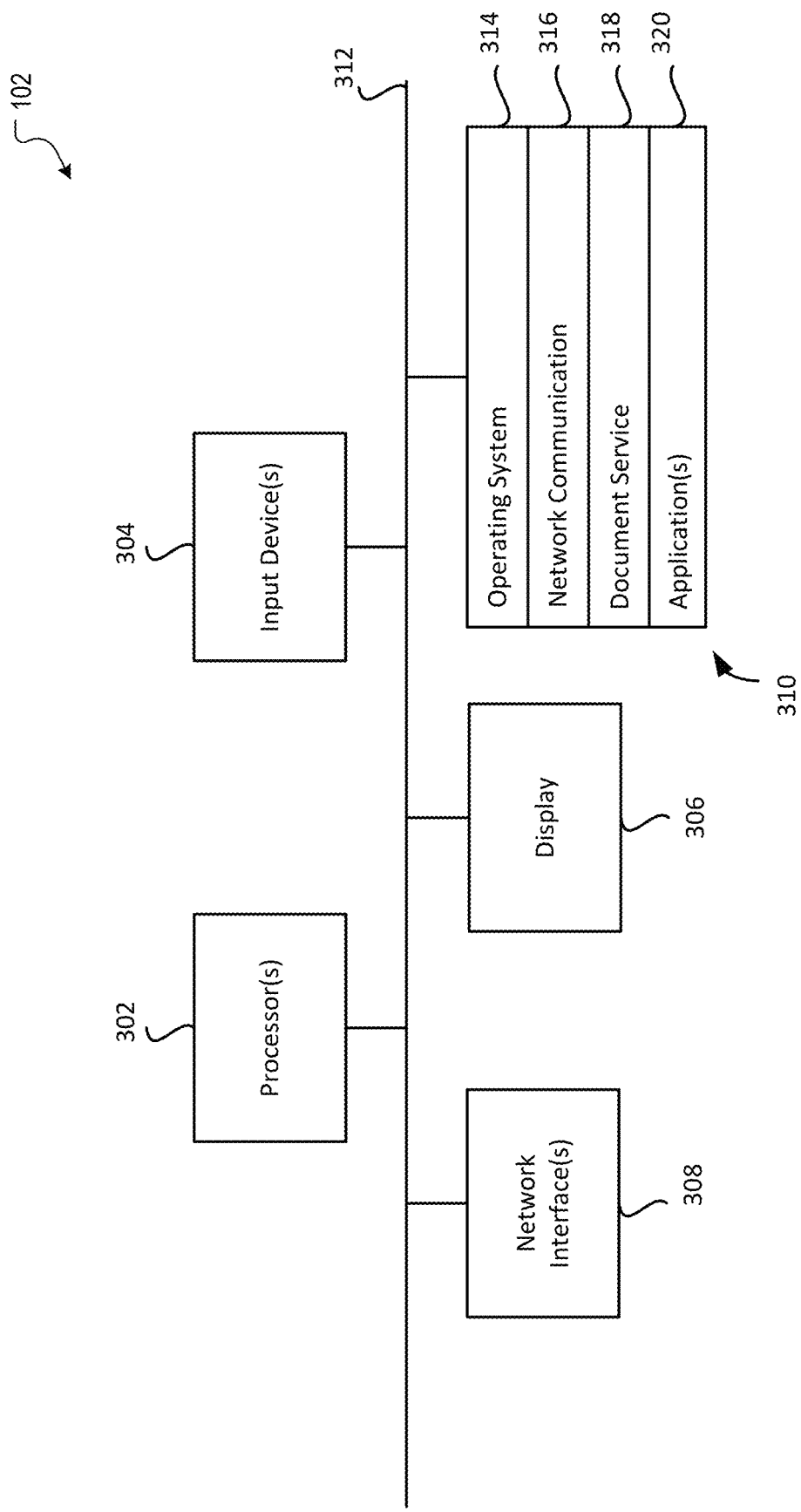
FIG. 3 shows a server device according to an embodiment of the present disclosure.

FIG. 3 is a block diagram of an example server device 102 that may implement various features and processes as described herein. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Document service instructions 318 can include instructions that generate documents as described herein. Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 5:
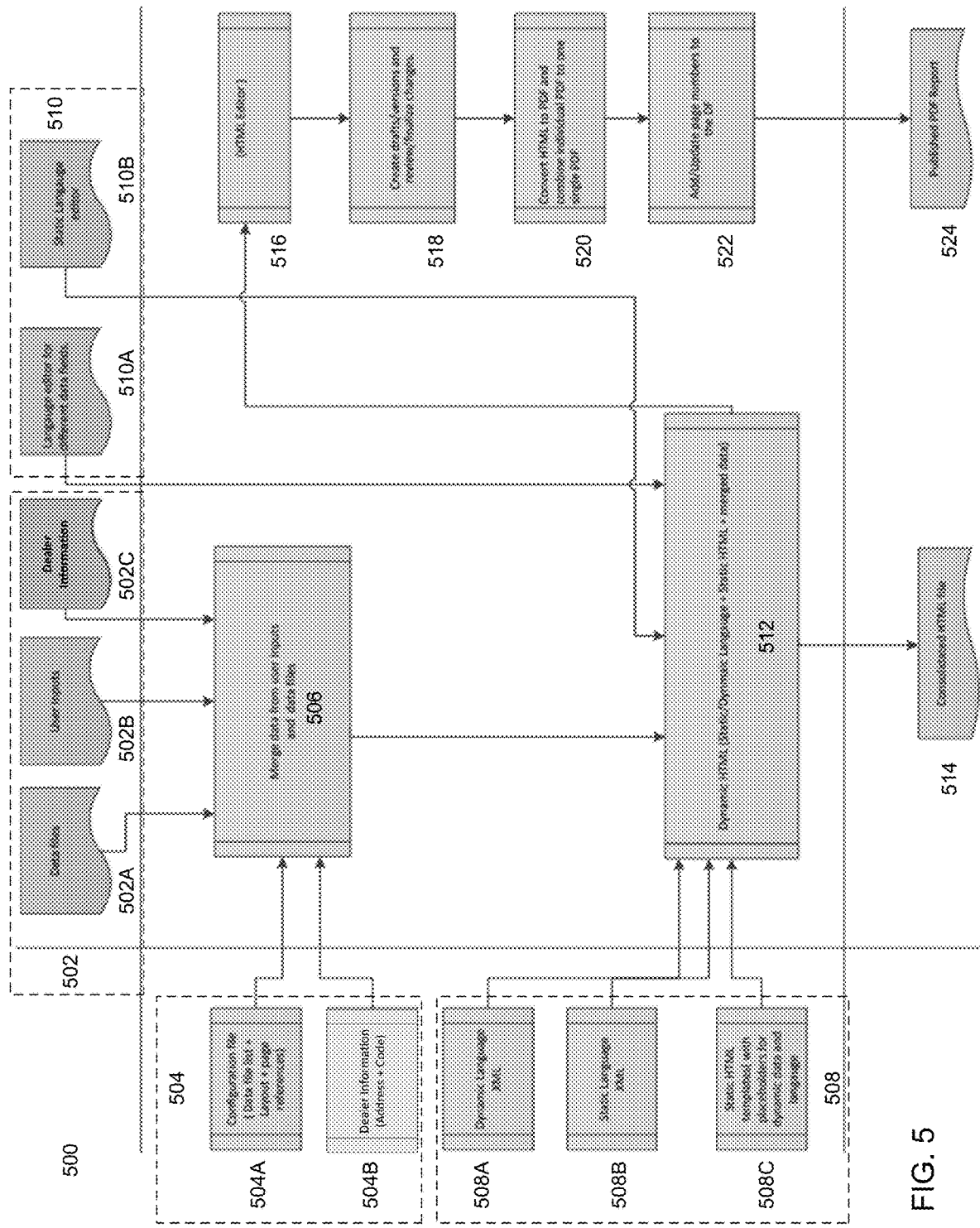
FIG. 5 shows a legal disclosure document generation process according to an embodiment of the present disclosure.

FIG. 5 shows a ProSup generation process 500 according to an embodiment of the present disclosure. Note that while process 500 is specifically directed to ProSup generation, it will be appreciated by those of ordinary skill in the art that process 500 may be modified for generating different legal disclosure documents in other embodiments. Server device 102 may perform ProSup generation process 500 in response to receiving a request to generate a ProSup from user device 112 and/or in response to receiving data files (e.g., as shown in FIGS. 4A-4G and described below), for example.

At 502, server device 102 may receive source files 504A and/or other input data (e.g., user inputs 502B identifying a type of ProSup to be generated and/or specific requirements for the ProSup; and/or dealer information 502C providing details about the dealer associated with the ProSup) from an external source (in some embodiments, some input data, such as dealer information 502C, may be omitted). In some embodiments, the source files and/or other data may be provided by user device 112. In a generic sense, data related to the collateral & deal/tranche information may be used to generate the ProSup. This may be because the ProSup's content may be driven by the collateral and deal/tranche structures. In some embodiments, data related to decs, yields, schedules, etc. may be optional, but not necessary, to generate the ProSup. In other words, the first draft of the ProSup may be generated so long as server device 102 has collateral and deal/tranche information in some embodiments. In this case, additional details can be appended in subsequent versions of the ProSup. In other embodiments where other types of documents are generated in addition to and/or instead of ProSups, different and/or additional input data may be used other than the examples of 502.

In some embodiments, the source files may include specific terms embedded in a file and/or one or more additional files, but other embodiments may have other file formats. In a generic sense, server device 102 may be able to use any raw data files in any format. The following is an example, but non-exclusive, list of some data elements that may be input to generate a ProSup:

1) Asset Cashflows or Collateral Level Information & Characteristics, such as:
   a. Balances
   b. WAC, WAM, WALA
   c. Underlying Asset Information, etc.
2) Detailed Securities or Tranche Level Information, such as:
   a. Original Balance
   b. P&I Types
   c. CUSIP Info
   d. Maturity Dates
   e. Exchangeable/Combination Classes
3) Deal Structure and Pay Rules
4) Decs, Yields, Schedules, etc.

FIGS. 4A-4G show source document examples 400-418 according to an embodiment of the present disclosure. Document 400 may include data related to asset or collateral type (e.g., collateral designation). Document 402 may include data related to asset cashflows or collateral (e.g., ARM collateral). Document 404 may include data related to principal pay or cashflow rules. Documents 406-410 may include data related to securities or class/tranche information. Document 412 may include data related to various disclosure elements relevant to the underlying assets or collateral, such as dec tables for example. Documents 414-416 may include data related to yield tables. Document 416 may include data related to schedules. These documents 400-418 are presented as examples only, and the data included therein may be provided to server device 102 in any format.

Returning to FIG. 5, at 504, server device 102 may identify local data relevant to the ProSup. For example, document service 104 may analyze data received at 502 to determine what configuration file(s) (e.g., file(s) for handling the specific data files 502A provided, layout generation data, page reference generation data) may be useful. Document service 104 may retrieve the identified configuration file(s) 504A from document database 106. Document service 104 may also analyze data received at 502 to identify and retrieve dealer information 504B (e.g., in document database 106), such as dealer address and/or code information.

At 506, server device 102 may merge data received at 502 and data gathered at 504. For example, document service 104 may assemble data useful for the following processing described below, such as the generation of a dynamic HTML version of the ProSup. If necessary, document service 104 may discard information not relevant to the following processing.

At 508, server device 102 may assemble local resources for the generation of the dynamic HTML version of the ProSup. For example, document service 104 may retrieve dynamic language XML resources 508A, static language XML resources 508B, and/or static HTML templates (which may include placeholders for the dynamic data and/or language) 508C from document database 106.

At 510, server device 102 may receive edits to dynamic language 510A and/or to static language 510B. For example, a user may edit aspects of dynamic language XML resources 508A, static language XML resources 508B, and/or static HTML templates 508C using an interface at user device 112 prior to generation of the ProSup in some embodiments.

Document service 104 may receive the edits from user device 112 and may implement the edits so that they appear in the generated ProSup.

At 512, server device 102 may generate one or more dynamic HTML templates for the ProSup based on the data gathered at 502-510. The base for the legal ProSup document ultimately generated by process 500 may be the underlying HTML templates generated at 512. The use of HTML templates as the base may support the editing features described below and may support the content formatting requirements of the legal ProSup document. Furthermore, HTML templates may be easily converted into a PDF document. The HTML templates may cover different types of deal structures along with the related formatting and alignment requirements for data tables, table headers, and footnotes and text, extracting the static and dynamic content, which the user can also update as described below. The HTML templates may act as placeholders for dynamic data depending on the deal type and underlying collateral information. The legal document may be logically segregated into multiple HTML templates. In some instances, there may be multiple HTML templates for a single section of the legal document, for example to accommodate different formatting requirements. Document service 104 may dynamically choose the appropriate template based on the deal type and formatting requirements. In some embodiments, Apache Velocity Templates may be used, which may support both static and dynamic contents. The dynamic contents may reference Java objects defined within Java code.

Document service 104 may use data file based mapping for the HTML templates. Thus, when a user reuploads a data file, only the associated HTML templates may be regenerated, keeping the remaining HTML templates unchanged. This may have the effects of persisting any manual edits made by the user via the editing user interface as described below, as well as reducing the processing demands and increasing the speed at which document service 104 can generate new ProSup documents in response to changes.

To generate the HTML templates, document service 104 may read the underlying data gathered at 502-510 and may use data modeling algorithm(s) to determine the deal type, collateral, groups, classes, and/or other relevant information. Document service 104 may apply rules based on the determined information to generate the corresponding content and update the HTML. Document service 104 may read the configuration file, which may contain a list of data files, associated HTML elements, and page references. Document service 104 may extract data and/or text from the underlying files and merge the extracted data along with other user inputs (e.g., from 502 and/or 510). Document service 104 may use one or more rule sets to generate the HTML files and/or to incorporate them with an underlying JAVA program. For example, HTML templates may have references to JAVA objects. The JAVA program may apply the rules, generate the content of the ProSup, and update the JAVA objects in the HTML. The rules may be applied based on the collateral and deal information, and the associated ProSup content from the JAVA service may be applied to the HTML templates.

In some embodiments, the ProSup may have one or more pay rules that document service 104 may receive from the inputs at 502-510 and apply during creation of the HTML templates. Document service 104 may have a parser (e.g., a Python based parser) to handle the payment rules. The parser may include rules to accommodate different deal structures, collateral information, and payment types. The parser may generate formatted content, which may be integrated as part of the legal document. When the user uploads a pay rules data file, document service 104 may internally call the parser and generate an output HTML template specific to the payment rules, which may be merged along with the rest of the HTML templates for creating the legal document.

For example, the parser may read the pay rules, presented in a computer- or human-generated format, and may determine, using keywords, which rules are applicable to each group that makes up the deal structure. As each line of data is parsed, a dictionary (e.g., Python dictionary OrderedDict) may be appended for the given group with human-language (e.g., English-language) text that describes the given pay rule, in appropriate sequence for the group's structure. Once all groups are parsed using the available keywords, document service 104 may generate the human-language text for all groups that make up the deal's structure. The text may outline, for each group, the sequence of principal distribution rules.

The principal distribution rules may be presented in a computer- or human-generated format, where specific keywords may be associated with specific principal distribution rules. These may include, but are not limited to, keywords that specify the following:

- A portion of the principal is distributed to given class(s) until balance is retired.
- A portion of the principal is distributed to given class(s) pro rata, until balance is retired.
- A portion of the principal is distributed to given class(s) or Aggregate Groups until a specific balance is reached.

Keywords may also be used to specify additional scenarios applicable to the structure. These may include, but are not limited to, keywords that specify the following:

- A portion of the principal is split into multiple components as percentage, where each percentage has its own distribution rules.
- A portion of the principal is split into multiple subgroups, where each subgroup has its own distribution rules ultimately applied to the main group, which consists of the subgroups.

Once the text, in sentence form, for all groups' pay rules is generated in the Python OrderedDict, document service 104 may write the keys (groups) and the values (sequential pay rules) to an output file. The final output may include HTML formatting tags for display purposes, such that the output of the pay rule parser may be integrated into the rest of the ProSup without additional formatting.

In the case of issues with the file containing the pay rules, document service 104 may generate an error log. For example, there may be at least two types of error logs as follows:

- The first may contain known errors, with detailed messages outlining the cause of the error. These may relate to known possible issues with the pay rule file, including formatting errors. The user may be able to edit the pay rule file as described below and rerun step 512 to generate the corrected principal distribution information. These error messages may be displayed on the user interface.
- The second may contain unexpected errors, with built-in Python error messaging. These may concern unknown errors with the pay rule file or the processing thereof. The cause of such issues may be formatting or content of the pay rules themselves. Document service 104 may log these errors for debugging purposes and may not display these errors on the user interface. However, once the cause of the error is identified, it may be added to the error log that contains known errors with user-focused error messaging.

In the case of no errors, no error logs may be generated. In the case of errors, one or both of the error logs may be generated, depending on the cause of the error. In cases where there are error(s) for one or more groups in the deal, but no errors for other groups, the parser may generate partial output along with the relevant error logs. In cases where there are error(s) for all groups in the deal, or where the pay rule input file cannot be parsed, the parser may generate a blank output file, along with the relevant error logs.

The pay rules described above may be specific to ProSup generation, but in some embodiments, pay rules may be in any format, and any technology (e.g., Python or otherwise) may be used to decipher the pay rules. In some embodiments, pay rules may be provided in human readable language, which may mitigate or eliminate the need for deciphering.

At 514, server device 102 may output a consolidated HTML file that may be the result of the processing at 512. For example, document service 104 may store the consolidated HTML file in document database 106.

At 516, server device 102 may receive edits to the HTML templates, and at 518, server device 102 may process the edits to update the HTML templates. For example, document service 104 may make the HTML templates generated at 512 available for editing by a user interface of user device 112. User device 112 may submit edits, and portions of the overall set of HTML templates that have been edited may be reprocessed at 512, leaving unedited portions of the overall set of HTML templates out of the reprocessing.

For example, a user may be able to edit static content and other content, such as collateral driven language, dealer information, etc. These edits and changes may be made at an individual deal level and/or may be made at a company level, applicable to all deals. Dynamic content may be edited, reviewed, and tracked in some embodiments. Interface examples are presented in FIGS. 6A-6L, described in detail below.

Specifically, in some embodiments users may be able to make extensive edits to the generated legal document at the HTML level before it is finalized into a PDF or other less dynamic format. In some examples, editing may be made possible through three open-source resources: Summernote, DaisyDiff, and Jsoup. In other examples, editing may be made possible through other software resources or combinations thereof providing similar functionality to Summernote, DaisyDiff, and Jsoup. These specific open-source resources are provided as examples only, and the disclosed systems and methods are not limited to these resources. Since the legal document may be a combination of many HTML templates, these resources may deal with presenting, manipulating, and processing HTML sources. Summernote is a WYSIWYG editor that allows users to edit the HTML sections. DaisyDiff marks the differences between an original and edited HTML section. Jsoup is used for HTML source processing and manipulation. Summernote is a client-side (JavaScript) resource, while DaisyDiff and Jsoup are server-side (JAVA) resources. These three resources may provide editing functionality including drafting, regenerating, and finalizing. These resources are presented as examples only, and other resources configured for providing similar functionality may be used in place of or in addition to the example resources.

Drafting may be a portion of the editing process that may start when a user wants to make changes to the generated legal document. The user may use an editing UI to make changes related to editing text, data tables, and/or table structure. In some cases, the user may edit text inside tables. The editing UI may facilitate this with dashed lines around tables in the display. These lines may aid the user in identifying tables and may be useful for editing a table's structure. When the user has completed making changes, they may use a UI element to save the changes. If a draft is already in progress, then it may be updated, otherwise, a new draft version may be created.

A draft may be a version that contains modifications that have not been finalized. Whenever a draft is generated, document service 104 and/or user device 112 may generate a preview of the legal document. This may show the user how their changes will look in the version once finalized. Document service 104 and/or user device 112 may produce a track-changes document. This document may mark the differences between the previous and the current version.

In some embodiments, document service 104 may track changes between other versions than a most previous version and a current version (e.g., changes between non-consecutive versions may be tracked, for example in response to user selection of specific versions to compare). For example, the user may have a select option in the UI to choose any two versions between which the user wanted to track the changes. Once the versions are selected and the change tracking process is initiated, document service 104 may compare and create the track changes document along with the version number. This may help to avoid processing time on document service 104 if the track changes document already exists for the versions being compared (e.g., if the user selected versions 1 and 4, document service 104 may create a track changes document (V4_V1_Tracked.pdf)). Specifically, in some embodiments this may be accomplished by identifying the underlying two different HTML sources for the different versions, passing them to Daisydiff and/or other comparison solutions which may compare them, and outputting a single HTML source with the marked differences (e.g., a marked file). These marked files may be consumed by middleware to create the track-changes document. This may provide flexibility for tracking changes at any point from the beginning of the draft until the deal is printed.

Document service 104 may perform some preprocessing before the legal document is made available in the editor. For example, user device 112 may invoke a web service to retrieve the HTML sections for both the previous and current version. Document service 104 may then perform the following processing for both versions:

Each section may be combined into a single HTML source. Each section may be denoted in the source, as it may be retrieved when the user saves the changes.

All tables may have their rows indexed. These indexes may be used to keep track of row deletions. This may be useful for marking the changes.

Escape HTML may be generated for use in JavaScript.

Once these items are done, document service 104 may send the data to user device 112 for processing by client-side editing tools.

If used, for example, Summernote may offer configurable WYSIWYG editor options in addition to JavaScript event handlers. One handler that may be used is named "addRow". This may allow the tool to track when a user adds a row to a table. An additional identifier may be placed onto the new row so that it can be identified later. This may be useful for marking changes. When the user clicks the save button, control may be passed back to the server-side document service 104.

At this point, document service 104 may retrieve each of the sections from the edited HTML. A web service may be invoked to save these sections. Document service 104 may determine whether there is an active draft and edit the request as such. Document service 104 may invoke middleware that may act by either creating a new draft or overwriting the active draft. Finally, document service 104 may invoke a web service to generate the legal document for the draft.

At this point, document service 104 may create the track-changes document. A prerequisite for the track-changes document may be the corresponding marked HTML section files. User device 112 may create these files. These files may contain the marked differences between the previous version and the current draft. If used, for example, DaisyDiff may consume the two HTML sources, compare them, and output a single HTML source with the marked differences. This output may become the HTML section marked file. Marked files may be consumed by the middleware to create the track-changes document.

Document service 104 may perform a special process to mark differences in tables because DaisyDiff may not mark them correctly. The custom solution may involve comparing the contents of two cells rather than the table structure. For example, document service 104 may proceed as follows:

1. Document service 104 may extract tables and place them into a collection. There may be two collections, one for the previous version and another for the current draft. For example, when the HTML templates were generated at 512, each table may have been encapsulated inside a div HTML element with a unique ID. This may allow new and deleted tables to be tracked in addition to their position being maintained. This may be static, so users cannot add new tables in the editor in some embodiments.

2. In both the previous and current HTML sections, document service 104 may remove the tables while leaving their respective empty div containers. This may leave just the raw elements to be compared.

3. Document service 104 may perform a comparison on the modified current and previous HTML elements from the previous step. The output may be a single HTML source.

4. Document service 104 may loop through the table collection for the current draft populated on step #1. Document service 104 may find the corresponding table ID in the previous version's collection.

4.1. Document service 104 may make sure the table structure is the same. This may include making sure that the table has the same number of rows and columns. Take the following example:

The current draft table:

| Col1 | Col2 |
|---|---|
| Col1Val1 | Col2Val1 |
| Col1Val2 | Col2Val2 |
| Col1Val3 | Col2Val3 |

The previous version table:

| Col1 | Col2 |
|---|---|
| Col1Val1 | Col2Val1 |
| Col1Val2 | Col2Val2 |

Notice that the previous version is missing a row. This may be corrected so that the previous version's table has an empty row. As mentioned earlier, rows may be indexed before the user can edit the HTML. Document service 104 may compare every row's index to see if they match. If they do not, this may indicate the row was either added or removed. In the event the row identifier did not indicate that it was added, it may have been removed.

| Col1 | Col2 |
|---|---|
| Col1Val1 | Col2Val1 |
| Col1Val2 | Col2Val2 |

Now that the previous and current tables have the same structure, document service 104 may start marking the differences.

4.2. Following the table correction(s), document service 104 may loop through the rows and their cells. The content of each cell may be extracted and compared using DaisyDiff. The difference may be saved back to the current draft table cell.

4.3. After all the rows are processed, document service 104 may place the marked table back into the marked HTML produced in step #3.

5. Document service 104 may save the marked HTML section that was built in step 3 and 4 in document database 106.

6. Lastly, document service 104 and/or user device 112 may invoke a web service to generate the track-changes document. Middleware may use the marked HTML sections.

When the track-changes document is created, document service 104 and/or user device 112 may use a similar process for displaying the editor and saving as described above.

In some embodiments, drafting is not the only way to initialize a draft version. In some cases, the user may need to make bulk edits. To facilitate this with an easier user experience and lighter processing demands at the same time, document service 104 may make the change in the data files (e.g., by incorporating a user input including the change) and then regenerate the legal document (e.g., by repeating 512). In this case, the user may re-upload the files (e g, similar to the upload at 502) and mark them for regeneration. Afterwards, document service 104 may create a new draft version for the user. This may include the same or similar draft content and process described above with respect to drafting.

For example, user device 112 may invoke a web service to form a request to initiate regeneration of the legal document. The request may indicate which files should be regenerated (e.g., by including user changes to one or more sections that necessitate regeneration of the one or more sections). Document service 104 may regenerate the affected sections and create a new draft version for the user as described above. However, to improve speed, minimize processing demands, and persist changes, only those files indicated in the request may be regenerated according to the processing in 512 described above.

In some embodiments, the user may be able to finalize a draft by accepting and rejecting the changes that have been made throughout the draft's lifespan. For example, user device 112 may present the option to accept the additions and reject the deletions. Once all changes have been either accepted or rejected, the user may select a finalize option to turn the draft into an official version.

In some embodiments, the finalize process may make use of the Summernote editor. The process may be similar to that of drafting with a few changes. The first change may be that the marked HTML sections may be read from sever device 102, combined, and shown. Once the HTML has been combined, user device 112 may show the editor with accept and reject functionality enabled.

Document service 104 and/or user device 112 may use a library (e.g., JavaScript library JQuery) to bind a popup menu to all markings. For example, a red marking may be given a menu with an option to accept the deletion. When the user accepts, the marking may be retained, and the red color may be removed. A green marking may be given a menu with an option to reject the addition. When the user rejects, the entire marking may be removed. User device 112 may provide a confirm all option for accepting and rejecting bulk changes (e.g., accepting all green markings and rejecting all red markings). Furthermore, the user may be able to make additional edits beyond accepting and rejecting previous edits at this stage.

After all changes have been handled, user device 112 may enable the finalize option. When a user selects the finalize option, document service 104 may perform the same generation process as described above for a normal draft. The only change may be that web service requests from user device 112 may indicate that this is the final draft. Once the draft is finalized, user device 112 may stop showing the editor interface.

At 520, server device 102 may convert HTML ProSup data to PDF ProSup data that may be in a presentable format (e.g., a legal document). For example, document service 104 may convert finalized HTML templates to PDF and merge the PDF templates into a single PDF document. In another example, document service 104 may merge HTML templates into a single HTML document and convert the HTML document to PDF.

For example, document service 104 may generate HTML with dynamic data may using Apache Velocity Engine for each template. Document service 104 may convert each of these HTML documents into a PDF document, possibly with different layouts (e.g., portrait or landscape), using each template's configuration. In some embodiments, document service 104 may use an open source tool (e.g., yahp) for the HTML to PDF conversion. Document service 104 may merge each of these PDF documents into a single document. In some embodiments, document service 104 may use an open source tool (e.g., PDFBox) for the merging.

At 522, server device 102 may add and/or update page numbers and/or references to the ProSup. For example, document service 104 may update page numbers and references dynamically and/or create a table of contents page and merge the table of contents page with the rest of the document.

At 524, server device 102 may output the PDF ProSup. For example, document service 104 may store the PDF ProSup in document database 106 and/or send the PDF ProSup to user device 112.

In some embodiments, server device 102 may provide support for creating draft PDF versions before creating a finalized version. Changes made between versions may be tracked and marked for review. Document service 104 may provide the option to review the changes made and to accept/reject the individual changes before finalizing a version. This may proceed similarly to the HTML based editing described above except that in the background, individual HTML templates may be converted to individual PDFs and then merged together to create a combined PDF version for presentation to the user.

Process 500 may be modified to create legal documents other than ProSups. For example, changing inputs at 502, 504, and/or 508 may cause different static and/or dynamic templates to use different data sets to generate different consolidated files at 514 and/or different published documents at 524. The ProSup is used as an illustrative example, but some embodiments configured according to the disclosure herein may not be limited to ProSup generation and/or may generate entirely different documents altogether.

FIGS. 6A-6L show UI examples according to an embodiment of the present disclosure. User device 112 may present the UI through a dedicated application, a browser window, etc. In some embodiments, UI may be used to generate and/or upload files to server device 102 as described above. In some embodiments, UI may be used to display and/or edit received ProSups from server device 102.

Figure 6B:
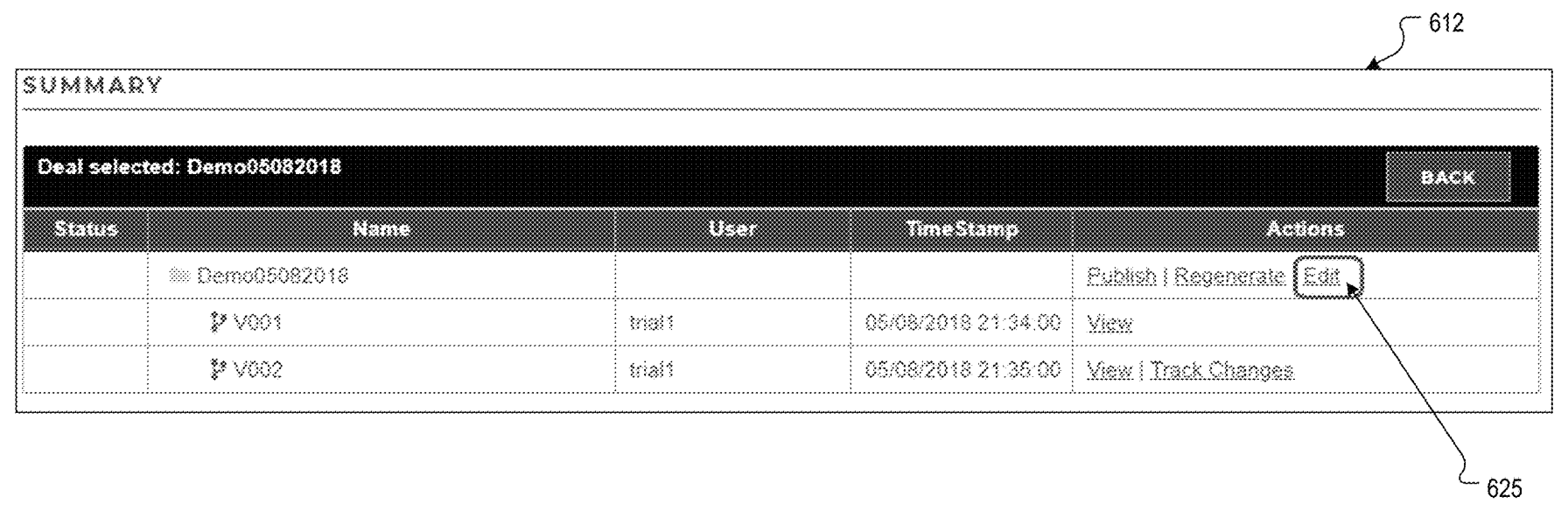

FIGS. 6A-6B show a UI example associated with editing a ProSup using an HTML editor interface 626. Changes made via the HTML Editor may not be persisted if the underlying input files are changed or re-uploaded, allowing the user to specify one-time changes to the ProSup. In summary interface 612, the user may select a deal for editing and select an edit option 625. This may open up HTML editor interface 626, wherein the user may make changes to the ProSup. When the user is finished, the user may select a finalize changes option 628. This may cause server device 102 to generate a new version of the ProSup with the changes included. When the deal is selected again in summary interface 612, the new version incorporating the changes may be available for viewing and/or download.

Figure 6C:
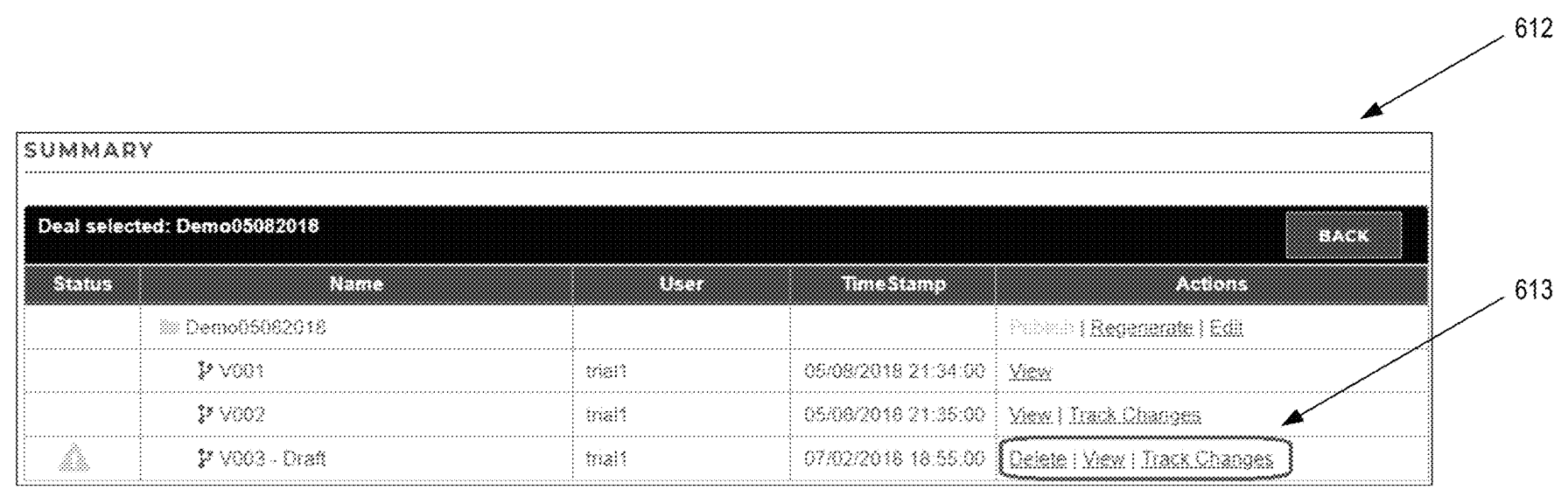
Figure 6D:
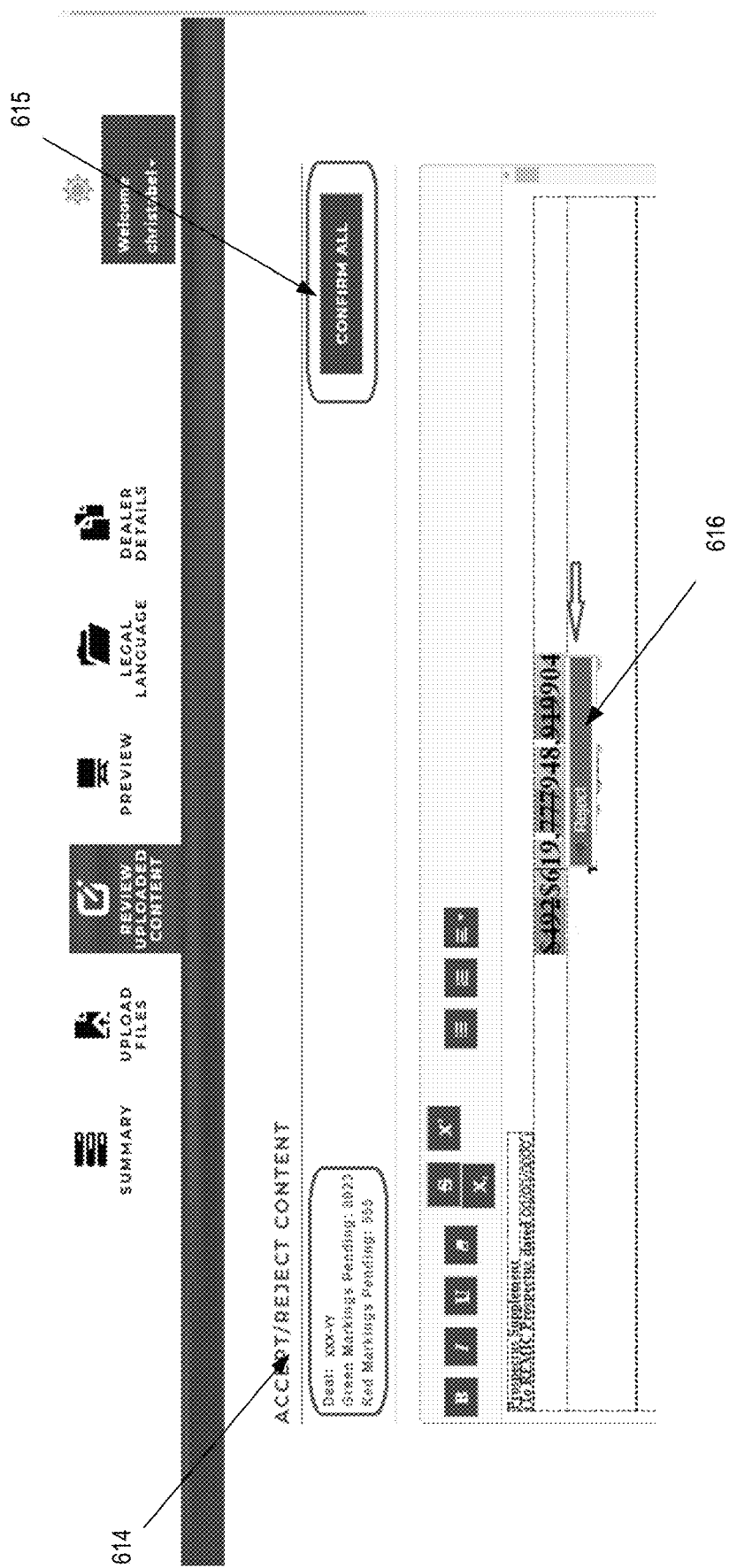

FIGS. 6C-6D show a UI example associated with editing a ProSup using accept/reject functionality. When the report generation status indicates the ProSup is completed, user may be presented with a summary UI interface 612. Summary UI interface 612 may include options 613 for deleting, viewing, tracking changes, and/or finalizing the draft ProSup that has just been generated. For example, the user may view tracked changes and see an interface with a summary of changes 614 and options to confirm all changes 615 and/or accept/reject individual changes 616. The user may be able to accept changes, reject changes, and/or finalize the ProSup.

Figure 6E:
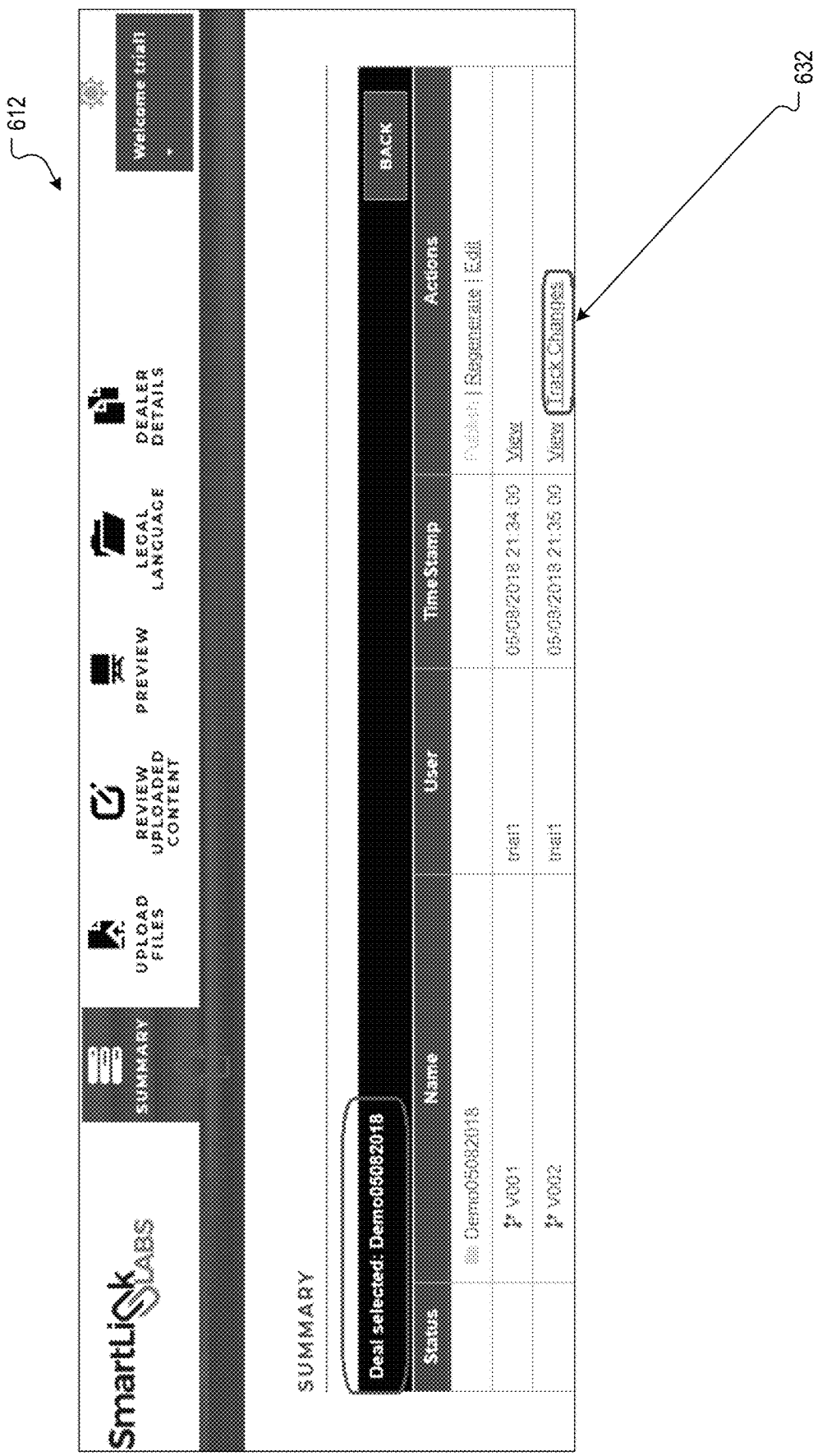
Figure 6F:
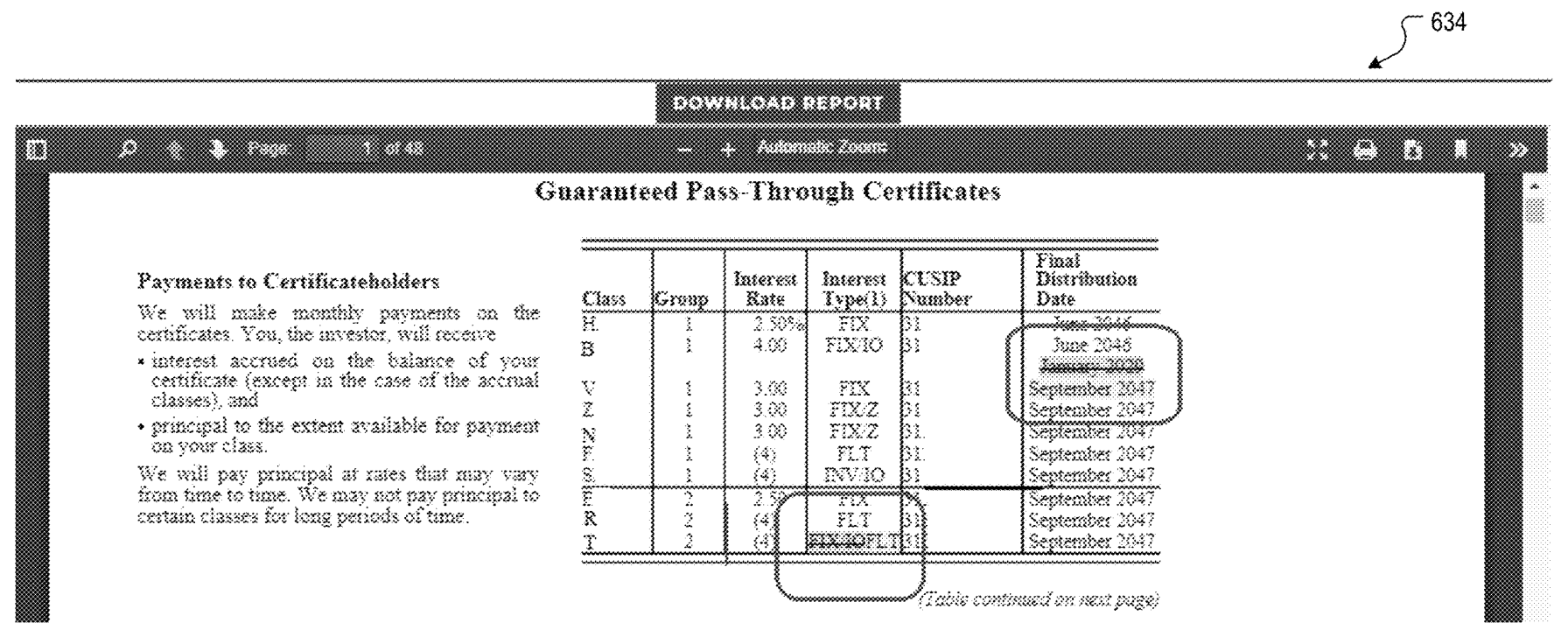

FIGS. 6E-6F show a UI example associated with viewing changes made to a ProSup. In summary interface 612, a user may select a summary option, choose a deal, and select a track changes option 632. User device 112 may display a version of the ProSup with changes tracked 634 (e.g., a pdf or other document with changes tracked from a version saved previous to edits made by the user as described above).

Figure 6G:
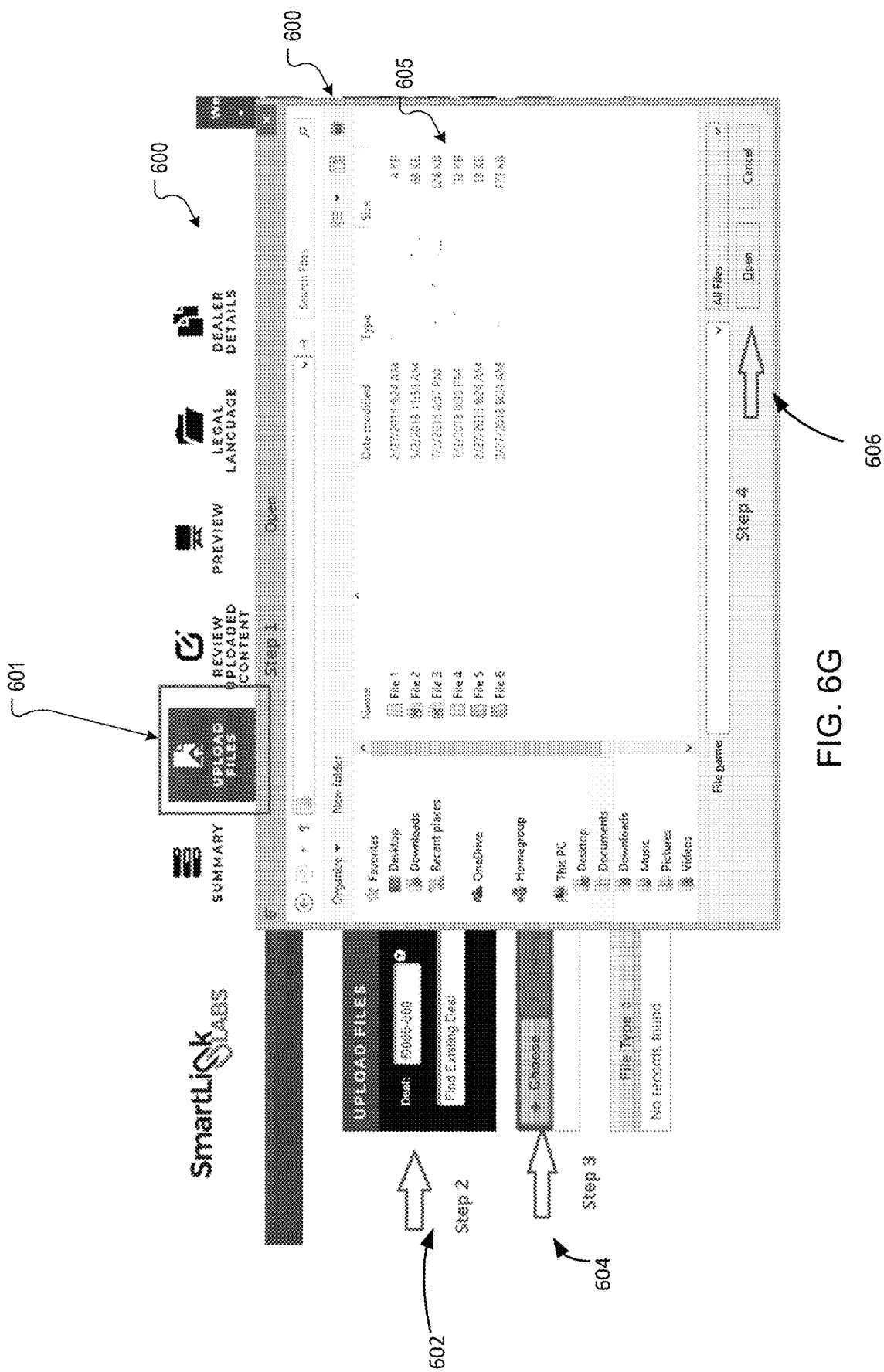
Figure 6H:
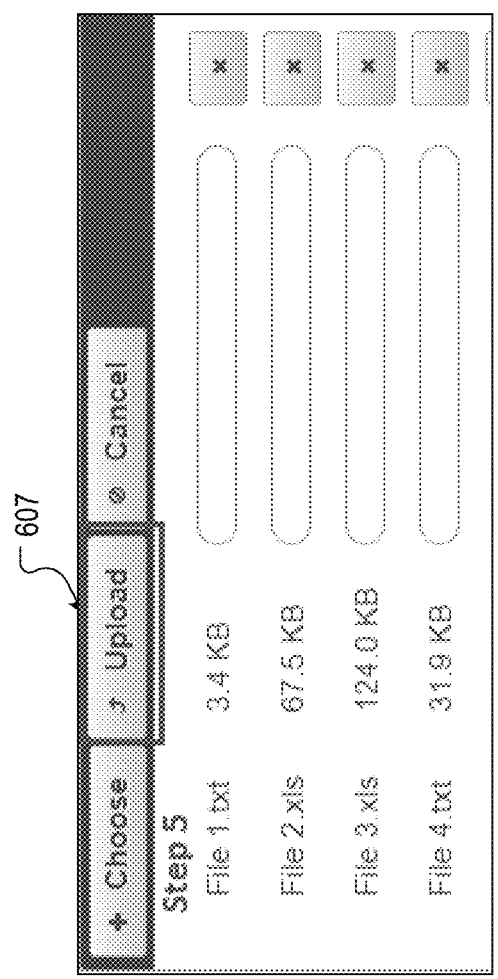

FIGS. 6G-6H show a UI example associated with a file upload. In an upload UI interface 600 presented by user device 112, a user may start by selecting an upload files option 601. The user may specify a deal name in a deal name text box 602. The user may select a choose option 602, which may cause user device 112 to display a file input dialog box 605. Using dialog box 605, the user may select input files to be used to create the ProSup. The user may have the option to select single or multiple files at the same time. Once files are selected, the user may select an open option 606 in the dialog box 605. This may cause user device 112 to copy the selected input files. Next, the user may select an upload option 607. The files selected by the user may be uploaded to server device 102 and may be available to be used to generate the ProSup.

Figure 6I:
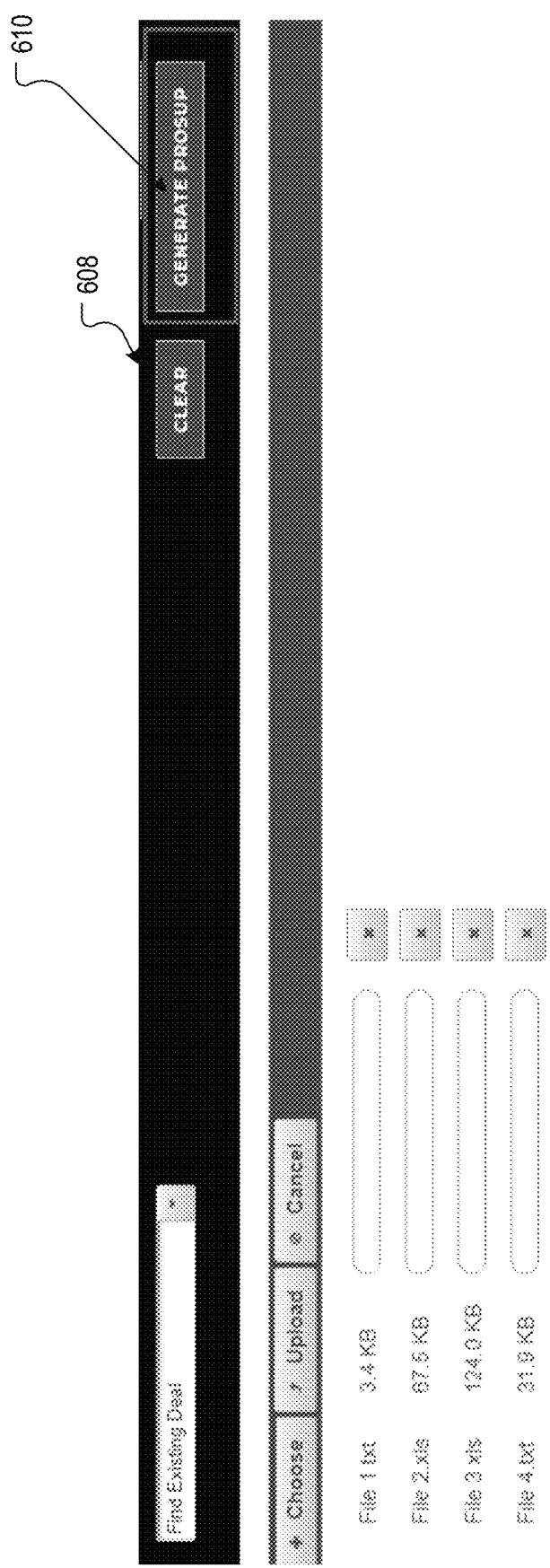

FIG. 6I shows a UI example associated with generating a ProSup. User device 112 may present an uploaded files UI interface 608. Once the files are uploaded, the user may select a generate ProSup option 610. This may issue a command to server device 102 causing server device 102 to generate the ProSup as described above. In some embodiments, a popup message may indicate the report generation status.

Figure 6J:
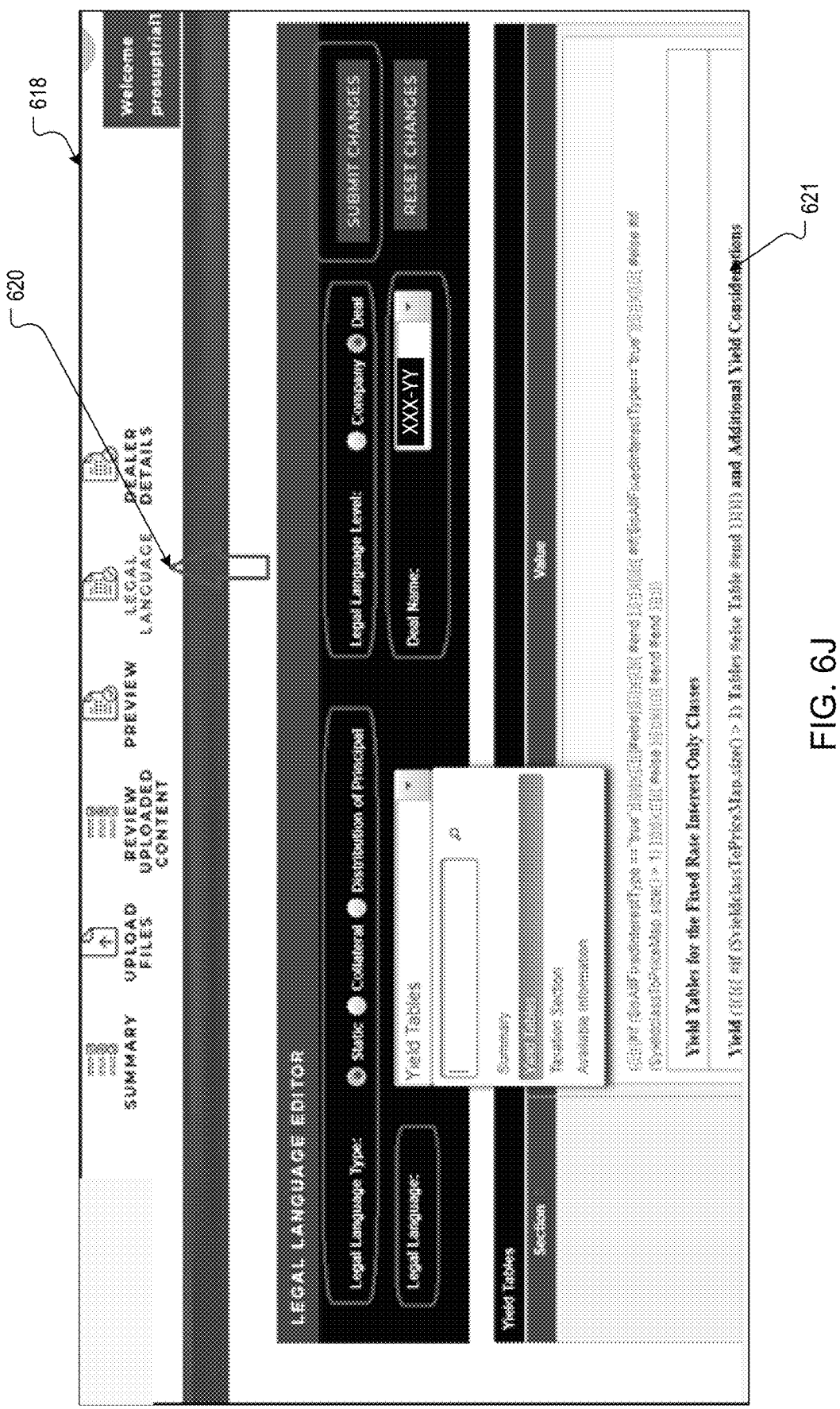
Figure 6K:
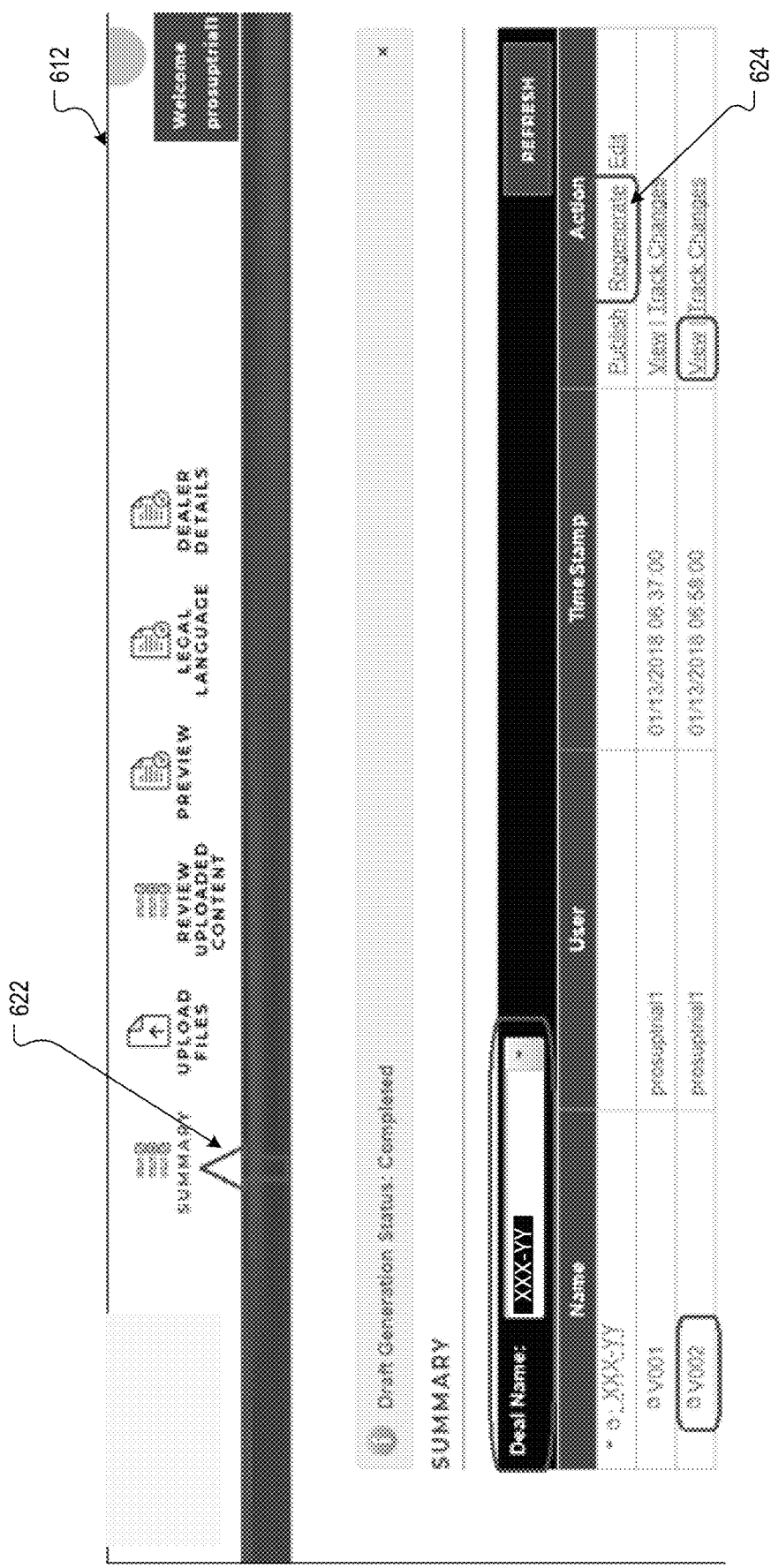

FIGS. 6J-6K show a UI example associated with editing a ProSup using a language editor interface 618. The user may make manual changes that are to be persisted using language editor interface 618. Changes made through language editor interface 618 may persist even if the underlying input file(s) change or get re-uploaded. To make changes, a user may select a legal language option 620 to bring up the editor 621 and select edit settings (e.g., legal language type, legal language level, section to edit, etc. The user may make edits as desired in the editor 621. In some embodiments, some text may be uneditable (e.g., code language that must be included). This language may be highlighted in red or otherwise indicated as uneditable. When edits are complete, the user may submit the changes. Once all the desired changes have been made, the user may select a summary option 622 to return to summary interface 612 and select a regenerate option 624 to regenerate the ProSup with the changes. Server device 102 may generate a new version of the ProSup with the changes included.

In some embodiments, ProSups may be editable at a company level. For example, this process may use language editor interface 618, but with a user selecting "company" as the legal language level instead of selecting a specific deal to edit. Any change made in the company level may be applied to all ProSups that are generated for the company moving forward.

Figure 6L:
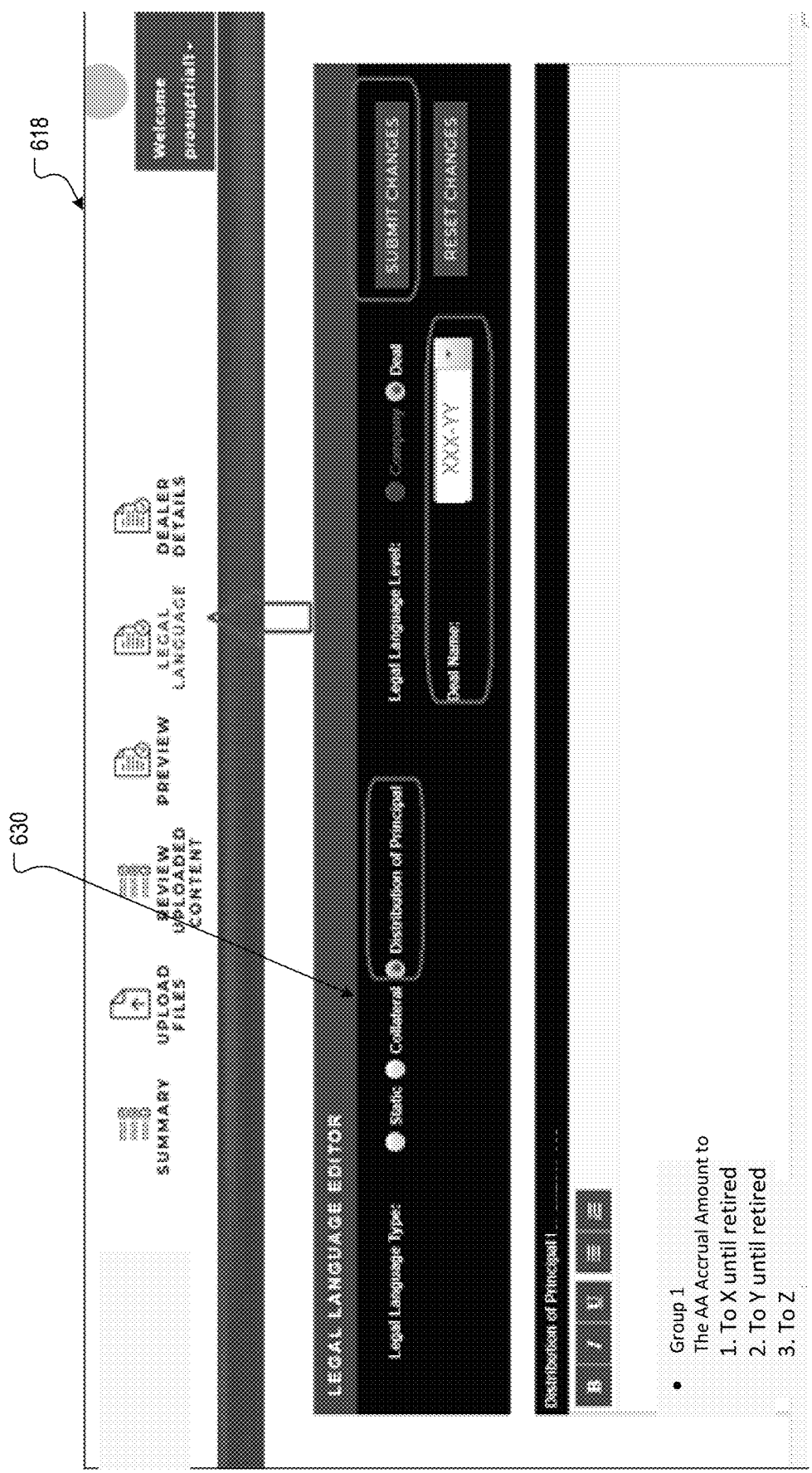

FIG. 6L shows a UI example associated with editing ProSups in different ways. In some embodiments, language editor interface 618 may allow a user to edit collateral designation language (e.g., language denoting the collateral type) on a deal and/or company level and/or distribution of principal language (e.g., language describing payment rules) on a deal and/or company level. The user may select one of these options using selection tool 630.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of automatically generating a formatted document comprising:
   receiving, by at least one processor, raw data;
   determining, by the at least one processor, at least one document formatting feature by analyzing the raw data, the analyzing including identifying a set of components of the formatted document contained within the raw data, and the at least one document formatting feature being selected to correspond to the set of components;
   selecting, by the at least one processor, at least one static template and at least one dynamic template corresponding to the at least one document formatting feature from at least one memory;
   generating, by the at least one processor, a dynamic document template including content of the selected at least one static template, content of the selected at least one dynamic template, and at least a portion of the raw data, the dynamic document template including a plurality of template sections arranging the raw data into a prescribed fixed document format, wherein the prescribed fixed document format is defined by a selection of one or more configuration files, from a plurality of available configuration files, that are selected to handle the set of components having been identified by the analyzing;
   receiving, by the at least one processor, at least one user change to the dynamic document template, the at least one user change affecting a subset of the template sections including less than all of the template sections;
   regenerating, by the at least one processor, the dynamic document template by regenerating only the subset of the template sections while preserving at least one template section unaffected by the at least one user change; and
   generating, by the at least one processor, the formatted document by processing the dynamic document template into a static form having the at least one document formatting feature and including the at least the portion of the raw data arranged into the prescribed fixed document format.

2. The method of claim 1, wherein the selecting is further based on at least one user input and/or at least one dealer information.

3. The method of claim 1, wherein the plurality of template sections are HTML documents.

4. The method of claim 1, wherein the formatted document is a legal disclosure document.

5. The method of claim 4, wherein:
   the at least one document formatting feature defines at least one legal disclosure document feature; and
   the generating of the dynamic document template includes arranging the at least the portion of the raw data into a legal disclosure document format including the at least one legal disclosure document feature.

6. The method of claim 4, wherein the legal disclosure document is a prospectus supplement.

7. The method of claim 6, wherein:
   the at least one document formatting feature defines at least one prospectus supplement feature; and
   the generating of the dynamic document template includes arranging the at least the portion of the raw data into a prospectus supplement format including the at least one prospectus supplement feature.

8. The method of claim 1, further comprising:
   modifying, by the at least one processor, the selected at least one static template, the selected at least one dynamic template, or a combination thereof based on the at least one user change; and
   storing, by the at least one processor, the modified at least one static template, the modified at least one dynamic template, or the combination thereof in the at least one memory.

9. The method of claim 1, further comprising providing, by the at least one processor, a user interface, wherein the raw data and the at least one user change are received through the user interface.

10. The method of claim 9, further comprising displaying, by the at least one processor, the dynamic document template in the user interface.

11. The method of claim 9, further comprising displaying, by the at least one processor, the formatted document in the user interface.

12. The method of claim 9, further comprising:
    generating, by the at least one processor, a tracked changes version of the dynamic document template showing at least one change between the generated dynamic document template and the regenerated dynamic document template; and
    displaying, by the at least one processor, the tracked changes version in the user interface.

13. A system for automatically generating a formatted document comprising:
    at least one processor; and
    at least one memory in communication with the at least one processor, the at least one memory configured to store a plurality of static templates, a plurality of dynamic templates, and a plurality of instructions that, when executed by the at least one processor, cause the at least one processor to perform processing comprising:
    receiving raw data;
    determining at least one document formatting feature by analyzing the raw data, the analyzing including identifying a set of components of the formatted document contained within the raw data, and the at least one document formatting feature being selected to correspond to the set of components;
    selecting at least one static template and at least one dynamic template corresponding to the at least one document formatting feature from the at least one memory;
    generating a dynamic document template including content of the selected at least one static template, content of the selected at least one dynamic template, and at least a portion of the raw data, the dynamic document template including a plurality of template sections arranging the raw data into a prescribed fixed document format, wherein the prescribed fixed document format is defined by a selection of one or more configuration files, from a plurality of available configuration files, that are selected to handle the set of components having been identified by the analyzing;

receiving at least one user change to the dynamic document template, the at least one user change affecting a subset of the template sections including less than all of the template sections;

regenerating the dynamic document template by regenerating only the subset of the template sections while preserving at least one template section unaffected by the at least one user change; and generating the formatted document by processing the dynamic document template into a static form having the at least one document formatting feature and including the at least the portion of the raw data arranged into the prescribed fixed document format.

14. The system of claim 13, wherein the selecting is further based on at least one user input and/or at least one dealer information.

15. The system of claim 13, wherein the plurality of template sections are HTML documents.

16. The system of claim 13, wherein the formatted document is a legal disclosure document.

17. The system of claim 16, wherein:
the at least one document formatting feature defines at least one legal disclosure document feature; and
the generating of the dynamic document template includes arranging the at least the portion of the raw data into a legal disclosure document format including the at least one legal disclosure document feature.

18. The system of claim 16, wherein the legal disclosure document is a prospectus supplement.

19. The system of claim 18, wherein:
the at least one document formatting feature defines at least one prospectus supplement feature; and
the generating of the dynamic document template includes arranging the at least the portion of the raw data into a prospectus supplement format including the at least one prospectus supplement feature.

20. The system of claim 13, wherein the instructions further cause the processor to perform processing comprising:
modifying the selected at least one static template, the selected at least one dynamic template, or a combination thereof based on the at least one user change; and
storing the modified at least one static template, the modified at least one dynamic template, or the combination thereof in the at least one memory.

21. The system of claim 13, wherein the instructions further cause the processor to perform processing comprising causing a user device to display a user interface, wherein the raw data and the at least one user change are received through the user interface.

22. The system of claim 21, wherein the instructions further cause the processor to perform processing comprising causing the user device to display the dynamic document template in the user interface.

23. The system of claim 21, wherein the instructions further cause the processor to perform processing comprising causing the user device to display the formatted document in the user interface.

24. The system of claim 21, wherein the instructions further cause the processor to perform processing comprising:
generating a tracked changes version of the dynamic document template showing at least one change between the generated dynamic document template and the regenerated dynamic document template; and
causing the user device to display the tracked changes version in the user interface.

\* \* \* \* \*